United States Patent
Tai et al.

(10) Patent No.: US 9,269,978 B2
(45) Date of Patent: Feb. 23, 2016

(54) WIND POWER AND HYDROGEN POWER COMPLEX GENERATING DEVICE

(75) Inventors: Chang-Hsien Tai, Pingtung (TW); JR-Ming Miao, Pingtung (TW); Yao-Nan Wang, Pingtung (TW)

(73) Assignee: NATIONAL PINGTUNG UNIVERSITY OF SCIENCE & TECHNOLOGY, Pingtung County (TW)

( * ) Notice: Subject to any disclaimer, the term of this patent is extended or adjusted under 35 U.S.C. 154(b) by 652 days.

(21) Appl. No.: 13/589,458

(22) Filed: Aug. 20, 2012

(65) Prior Publication Data
US 2013/0115534 A1    May 9, 2013

(30) Foreign Application Priority Data
Nov. 3, 2011   (TW) .............................. 100140111 A

(51) Int. Cl.
| H01M 8/00 | (2006.01) |
| H01M 8/06 | (2006.01) |
| H01M 8/18 | (2006.01) |

(52) U.S. Cl.
CPC ............ *H01M 8/0656* (2013.01); *H01M 8/184* (2013.01); *Y02E 60/528* (2013.01)

(58) Field of Classification Search
USPC .................................... 429/400, 418; 290/55
IPC ......................... H02J 3/386,3/387; H01M 8/00
See application file for complete search history.

(56) References Cited

U.S. PATENT DOCUMENTS

| 5,345,786 | A * | 9/1994 | Yoda et al. ...................... 62/476 |
| 5,592,028 | A * | 1/1997 | Pritchard ........................ 290/55 |
| 6,383,672 | B1 * | 5/2002 | Fujita ............................ 429/434 |
| 6,872,484 | B2 * | 3/2005 | Katagiri et al. ............... 429/414 |
| 7,981,556 | B2 * | 7/2011 | Shiroma et al. ............... 429/437 |

* cited by examiner

*Primary Examiner* — Patrick Ryan
*Assistant Examiner* — Julian Anthony
(74) *Attorney, Agent, or Firm* — Muncy, Geissler, Olds & Lowe, P.C.

(57) ABSTRACT

A wind power and hydrogen power complex generating device includes a fan assembly having a blade unit and a demultiplexer connected to the blade unit. A heating unit is connected to a first output end of the demultiplexer. A pump is connected to a second output end of the demultiplexer. The pump pressurizes liquid water. A heating assembly is connected to the pump and the heating unit. The heating assembly heats the liquid water into a critical state. An electrolyzing unit includes an input end, a hydrogen output end, and an oxygen output end. The input end is connected to the heating assembly. The electrolyzing unit electrolyzes the liquid water in the critical state into gaseous hydrogen and gaseous oxygen. A fuel cell unit includes an anode passage connected to the hydrogen output end and a cathode passage connected to the oxygen output end.

10 Claims, 3 Drawing Sheets

WIND POWER AND HYDROGEN POWER COMPLEX GENERATING DEVICE

BACKGROUND OF THE INVENTION

1. Field of the Invention

The present invention relates to a generating device and, more particularly, to a wind power and hydrogen power complex generating device using a fuel cell unit.

2. Description of the Related Art

FIG. 1 shows a conventional wind power generating device 9 including a post 91, a blade unit, 92, a generator set 93 and a gear box. The blade unit 92 is rotatably mounted to a top end of the post 91. The generator set 93 is connected via the gear box to the blade unit 92. When the blade unit 92 is driven by wind to rotate, the gear box regulates the rotating speed and then drives the generator set 93 to generate electricity.

Generally, the wind power generating device 9 captures the wind power by using lift-type or drag-type blades. A rotating shaft and a gear train of the generator set 93 convert the wind power into mechanical energy, which, in turn, is converted into electrical energy. However, the conversion coefficient during conversion from the wind power to the mechanical energy is about 0.52 according to the Betz's law; namely, only about a half of the wind power is converted by the wind power generating device 9, and the other half of the wind power is lost during the conversion, causing limitation to the amount of electricity generated by the generator set 93 through conversion from the mechanical energy to the electrical energy. The amount of electricity generated is also limited by the operating capacity of the generator set 93. Thus, the electricity generating effect of the wind power generating device 9 is not good. Improvement to the wind power generating device 9 is, thus, required.

SUMMARY OF THE INVENTION

An objective of the present invention is to provide a wind power and hydrogen power complex generating device that converts wind power into chemical energy to activate a fuel cell unit to generate electrical energy while using wind power and hydrogen power to increase the energy required during conversion, enhancing the electricity generating effect.

The present invention fulfills the above objective by providing a wind power and hydrogen power complex generating device including a fan assembly having a blade unit and a demultiplexer connected to the blade unit. The demultiplexer includes a first output end and a second output end. A heating unit is connected to the first output end of the demultiplexer. A pump is connected to the second output end of the demultiplexer. The pump pressurizes liquid water. A heating assembly is connected to the pump and the heating unit. The heating assembly heats the liquid water into a critical state. An electrolyzing unit includes an input end, a hydrogen output end, and an oxygen output end. The input end is connected to the heating assembly. The electrolyzing unit electrolyzes the liquid water in the critical state into gaseous hydrogen and gaseous oxygen. A fuel cell unit includes an anode passage and a cathode passage. The anode passage is connected to the hydrogen output end. The cathode passage is connected to the oxygen output end.

The heating unit can be a solar heater or a heat pump, and the heating assembly includes a primary heater connected to the heating unit.

The heating assembly can further include a first heater mounted between the pump and the primary heater.

A first radiator can be connected to the hydrogen output end and connected to the first heater.

The heating assembly can further include a second heater mounted between the primary heater and the electrolyzing unit.

A second radiator can be connected to the oxygen output end and connected to the second heater.

The heating unit can include a compressor, an evaporator, a throttle valve, and a condenser connected in series to form a closed system, with the compressor connected to the demultiplexer, with the condenser connected to the heating assembly.

The fuel cell unit can include a gaseous water output connected to a radiator.

A water tank can be mounted between the pump and the gaseous water output of the fuel cell unit.

A first humidifier can be mounted between the gaseous output end and the anode passage. A second humidifier can be mounted between the oxygen output end and the cathode passage. Each of the first and second humidifiers is connected by a pipe to the gaseous water output.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

The term "normal temperature" referred to hereinafter means the temperature of 300K, which can be appreciated by one having ordinary skill in the art. The term "high temperature" referred to hereinafter means a temperature higher than the "normal temperature".

The term "normal pressure" referred to hereinafter means 1 atm, which can be appreciated by one having ordinary skill in the art. The term "high pressure" referred to hereinafter means a pressure higher than the "normal pressure".

Figure 1:
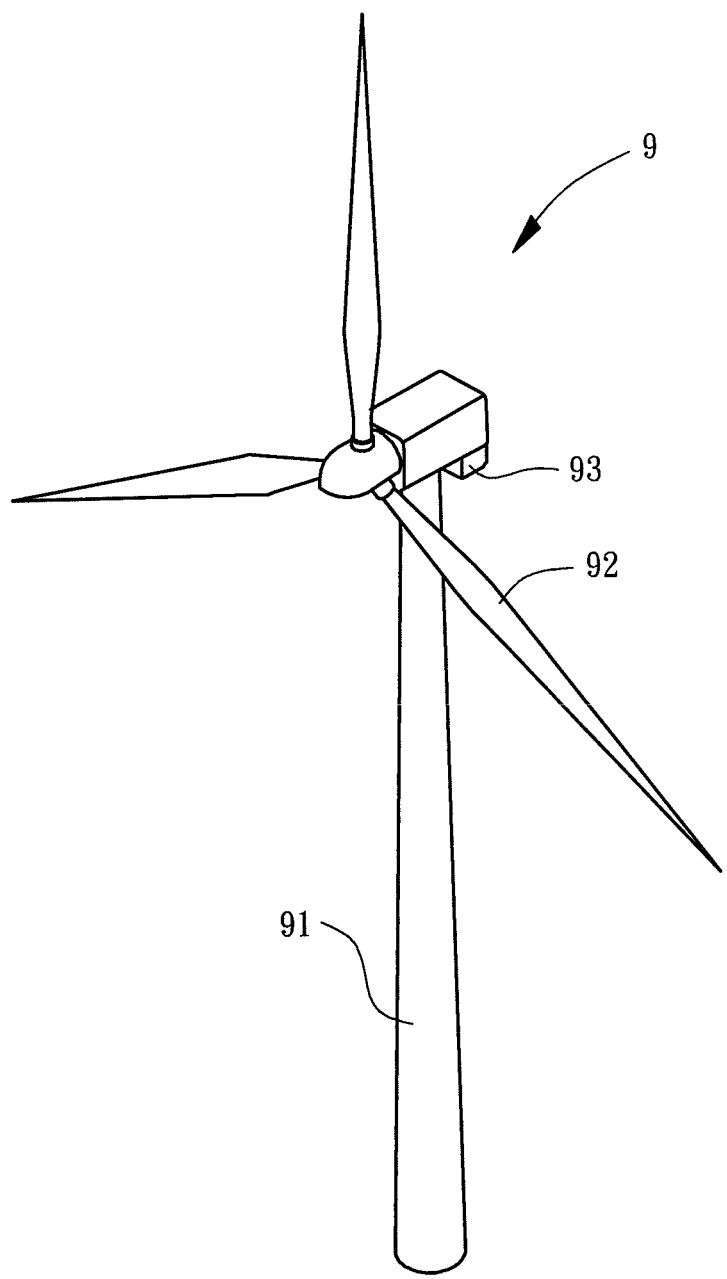
FIG. 1 shows a perspective view of a conventional wind power generating device.
Figure 2:
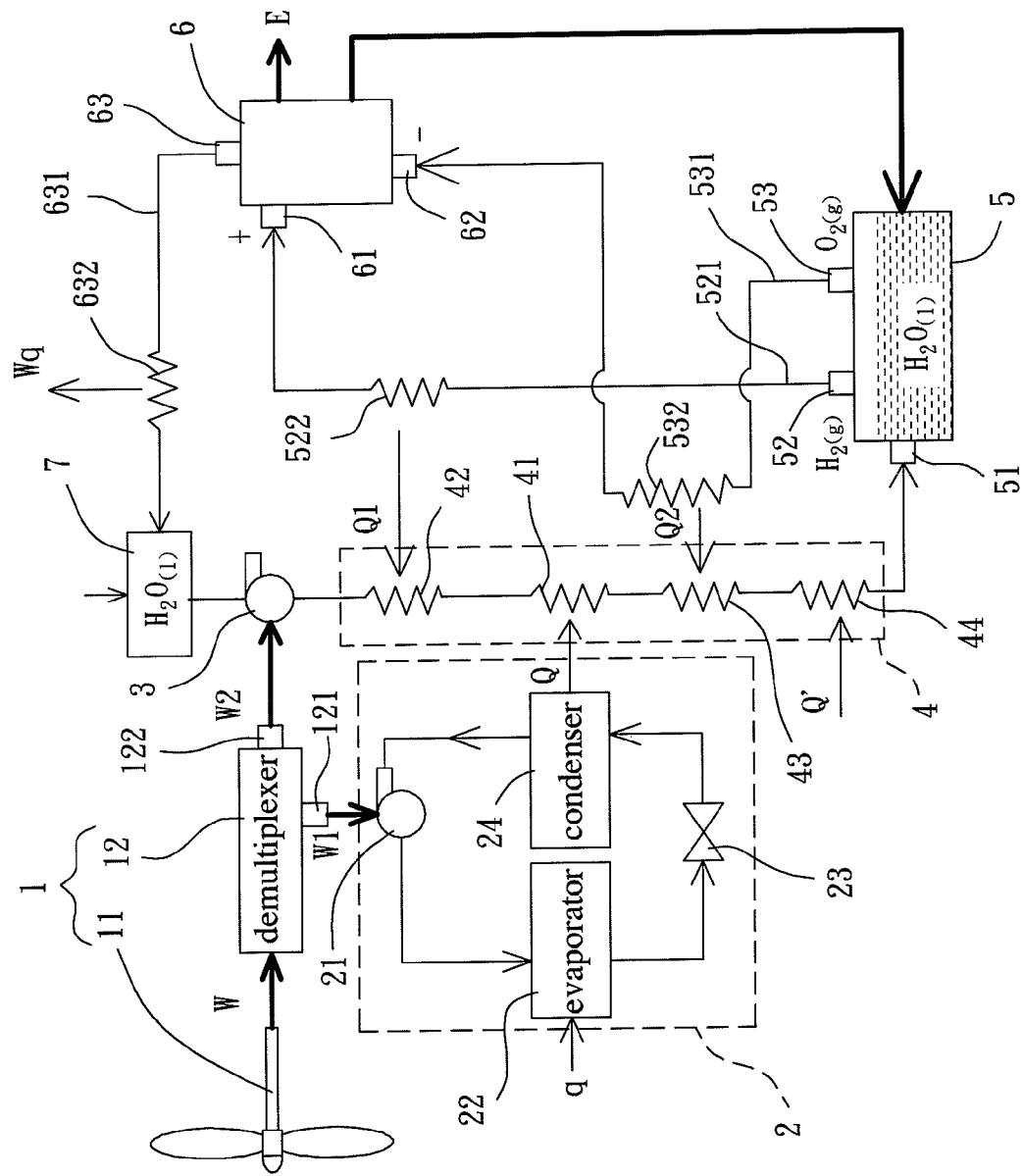
FIG. 2 shows a schematic diagram illustrating a wind power and hydrogen power complex generating device of a first embodiment according to the present invention.

With reference to FIG. 2, a wind power and hydrogen power complex generating device of a first embodiment according to the present invention includes a fan assembly 1, a heating unit 2, a pump 3, a heating assembly 4, an electrolyzing unit 5 and a fuel cell unit 6. The fan assembly 1 is connected to the heating unit 2 and the pump 3. The pump 3 is connected to the heating assembly 4. The electrolyzing unit 5 is connected to the heating assembly 4 and the fuel cell unit 6.

The fan assembly 1 is capable of capturing wind power and outputting a shaft work to drive the heating unit 2 and the pump 3. In this embodiment, the fan assembly 1 includes a blade unit 11 and a demultiplexer 12. The blade unit 11 can be lift type or drag type. The blade unit 11 captures the wind power and outputs a shaft work W. The demultiplexer 12 is connected to the blade unit 11 and divides the shaft work W outputted by the blade unit 11 into a first shaft work W1 and a second shaft work W2. The demultiplexer 12 includes a first output end 121 and a second output end 122, with the first output end 121 outputting the first shaft work W1, with the second output end 122 outputting the second shaft work W2.

The heating unit 2 is connected to the first output end 121 of the demultiplexer 12. The heating unit 2 can be a solar heater or heat pump. The first shaft work W1 activates the heating unit 2 to output a primary heat Q. Specifically, in this embodiment, the heating unit 2 is a heat pump and includes a compressor 21, an evaporator 22, a throttle valve 23 and a condenser 24 that are connected in series by pipes to form a closed system, with a working fluid filled in the pipes, which can be appreciated by one having ordinary skill in the art. Note that the compressor 21 is connected to the first output end 121 to receive the first shaft work W1 from the demultiplexer 12 and compresses the working fluid to a high pressure state. The heating unit 2 uses the evaporator 22 to absorb a low-temperature sensible heat source q and outputs the primary heat Q through the condenser 24, achieving conversion of energy. The temperature of the low-temperature sensible heat source q is below 100° C. and is lower than the temperature of the primary heat Q, which can be appreciated by one having ordinary skill in the art.

The pump 3 is connected to the second output end 122 of the demultiplexer 12 and is used to compress normal temperature/normal pressure liquid water $H_2O_{(l)}$ (hereinafter referred to as "first liquid water") into normal temperature/high pressure liquid water (hereinafter referred to as "second liquid water"). Specifically, the pump 3 is used to increase the pressure of liquid water into a critical state (an operative state).

The heating assembly 4 is connected to the heating unit 2 and the pump 3 for heating the second liquid water into high temperature/high pressure liquid water (hereinafter referred to as "third liquid water"). The thermodynamic state of the third liquid water reaches the critical state. Specifically, the heating assembly 4 includes a primary heater 41, a first heater 42 and a second heater 43. In this embodiment, the primary heater 41 is mounted between the first and second heaters 42 and 43, with the first heater 42 connected to the pump 3. However, the present invention is not limited to this arrangement. In use, the positions of the primary heater 41 and the first and second heaters 42 and 43 can be changed. The primary heater 41 can be connected to the heating unit 2 and use the primary heat Q from the heating unit 2 to heat the second liquid water. In this embodiment, the primary heater 41 is connected to the condenser 24 and can use a first heat Q1 to heat the second liquid water, and the second heater 43 can use a second heat Q2 to heat the second liquid water.

Note that the primary heater 41 and the first and second heaters 42 and 43 are arranged to turn the second liquid water into the third liquid water by heating. In a case that the primary heat Q and the first and second heats Q1 and Q2 are insufficient to heat the second liquid water into the critical state, the heating assembly 4 can include an auxiliary heater 44 that uses an auxiliary heat Q' to heat the second liquid water, assuring the temperature of the second liquid water can be increased for turning the second liquid water into the third liquid water.

The electrolyzing unit 5 is connected to the heating assembly 4. The third liquid water is guided by the heating assembly 4 into the electrolyzing unit 5 and undergoes critical-state electrolysis. In other words, regardless of the positional relationship between the primary heater 41 and the first and second heaters 42 and 43, the electrolyzing unit 5 receives the third liquid water from the heating assembly 4. Specifically, in this embodiment, the electrolyzing unit 5 is connected to the second heater 43. In a case that the auxiliary heater 44 is used, the electrolyzing unit 5 can be connected to the auxiliary heater 44. The electrolyzing unit 5 is capable of electrolyzing the third liquid water in the critical state into high temperature/high pressure gaseous hydrogen $H_{2(g)}$ (hereinafter referred to as "first gaseous hydrogen") and high temperature/high pressure gaseous oxygen $O_{2(g)}$ (hereinafter referred to as "first gaseous oxygen"). A catalyst can be added according to need to expedite the reaction. The electrolyzing unit 5 guides the first gaseous hydrogen and the first gaseous oxygen into different pipes. Specifically, the electrolyzing unit 5 includes an input end 51, a hydrogen output end 52 and an oxygen output end 53. The input end 51 is connected to the second heater 43 or the auxiliary heater 44. The hydrogen output end 52 is connected to a first pipe 521 for guiding the first gaseous hydrogen out of the electrolyzing unit 5. The oxygen output end 53 is connected to a second pipe 531 for guiding the first gaseous oxygen out of the electrolyzing unit 5.

Note that first and second radiators 522 and 532 can be mounted on the first and second pipes 521 and 531, respectively. The first radiator 522 can release the heat of the first gaseous hydrogen to lower the temperature of the first gaseous hydrogen to a specific temperature before entering an anode passage of the fuel cell unit 6. The second radiator 532 can release the heat of the first gaseous oxygen to lower the temperature of the first gaseous oxygen to a specific temperature before entering a cathode passage of the fuel cell unit 6. Note that the first gaseous hydrogen is referred to as "second gaseous hydrogen" after the temperature is lowered and that the first gaseous oxygen is referred to as "second gaseous oxygen" after the temperature is lowered. The temperatures of the second gaseous hydrogen and the second gaseous oxygen can be set according to the operating characteristics of the fuel cell unit 6. Specifically, in this embodiment, the first radiator 522 is connected to the first heater 42 for turning the first gaseous hydrogen into the second gaseous hydrogen. Namely, the first radiator 522 can guide the first heat Q1 into the first heater 42 such that the first heater 42 can use the first heat Q1 to heat the second liquid water. The second radiator 532 is connected to the second heater 43 to turn the first gaseous oxygen into the second gaseous oxygen. Namely, the second radiator 532 can guide the second heat Q2 into the second heater 43 such that the second heater 43 can use the second heat Q2 to heat the second liquid water. By using the first and second heats Q1 and Q2 to heat the second liquid water, the heat can be recycled and reused to save energy.

The fuel cell unit 6 is connected to the electrolyzing unit 5 and uses the second gaseous hydrogen and the second gaseous oxygen as the fuel to generate electrical energy E through electrochemical reaction. The fuel cell unit 6 can output the electrical energy E to any place or equipment or save the electrical energy E. A portion of the electrical energy E can be guided by the fuel cell unit 6 into the electrolyzing unit 5, serving as the power source for the electrolyzing unit 5. Specifically, the fuel cell unit 6 includes an anode passage

61 connected to the hydrogen output end 52 and a cathode passage 62 connected to the oxygen output end 53. In this embodiment, the anode passage 61 receives the second gaseous hydrogen delivered by the first pipe 521. The cathode passage 62 received the second gaseous oxygen delivered by the second pipe 531.

Since the second gaseous hydrogen and the second gaseous oxygen undergo electrochemical reaction in the fuel cell unit 6 under the presence of a catalyst to generate the electrical energy E while producing $H_2O_{(g)}$ (hereinafter referred to as "first gaseous water"), the fuel cell unit 6 can further include a gaseous water outlet 63 for guiding the first gaseous water to a desired place or equipment for recycling and reuse purposes. Furthermore, a duct 631 can be connected to the gaseous water outlet 63, and a radiator 632 can be mounted on the duct 631 to release the heat Wq of the first gaseous water, such that the first gaseous water condenses into normal temperature/normal pressure first liquid water. In brief, the fuel cell unit 6 can output the electrical energy E and the gaseous water that can be recycled and reused.

With reference to FIG. 2, in use of the wind power and hydrogen power complex generating device according to the present invention, the pump 3 is connected to a water tank 7 receiving the first liquid water. The water tank 7 is connected to the gaseous water outlet 63 such that the first gaseous water flowing through the radiator 632 can be converted into the first liquid water that flows into the water tank 7 for recycling and reuse. Specifically, the blade unit 11 captures the wind power and outputs the shaft work W to the demultiplexer 12, and the demultiplexer 12 outputs the first and second shaft works W1 and W2 to the heating unit 2 and the pump 3. Then, the water tank 7 guides the first liquid water into the pump 3. The pump 3 increases the pressure of the first liquid water and guides the second liquid water into the heating assembly 4. Through provision of the heating unit 2 and the heating assembly 4, the second liquid water is heated and turns into the third liquid water that is guided into the electrolyzing unit 5. The electrolyzing unit 5 produces the gaseous hydrogen and the gaseous oxygen through electrolysis. The gaseous hydrogen and the gaseous oxygen are respectively guided into the anode passage 61 and the cathode passage 62. Thus, the fuel cell unit 6 can smoothly output the electrical energy E through electrochemical reaction.

The main features of the wind power and hydrogen power complex generating device according to the present invention are that, instead of directly converting the shaft work into electrical energy through a generator set, the blade unit 11 captures the wind power and outputs the shaft work W that is used to activate the heating unit 2 and the pump 3, and the wind power and hydrogen power can be smoothly converted into electrical energy through provision of the heating assembly 4, the electrolyzing unit 5 and the fuel cell unit 6. Compared to the prior art subjected to the limitation of the generator set while converting wind power into electrical energy, the generating device according to the present invention can effectively increase the utility rate of wind power and hydrogen power and effectively reduce the loss of energy during conversion. Thus, the generating device according to the present invention can increase the electricity generating effect.

Figure 3:
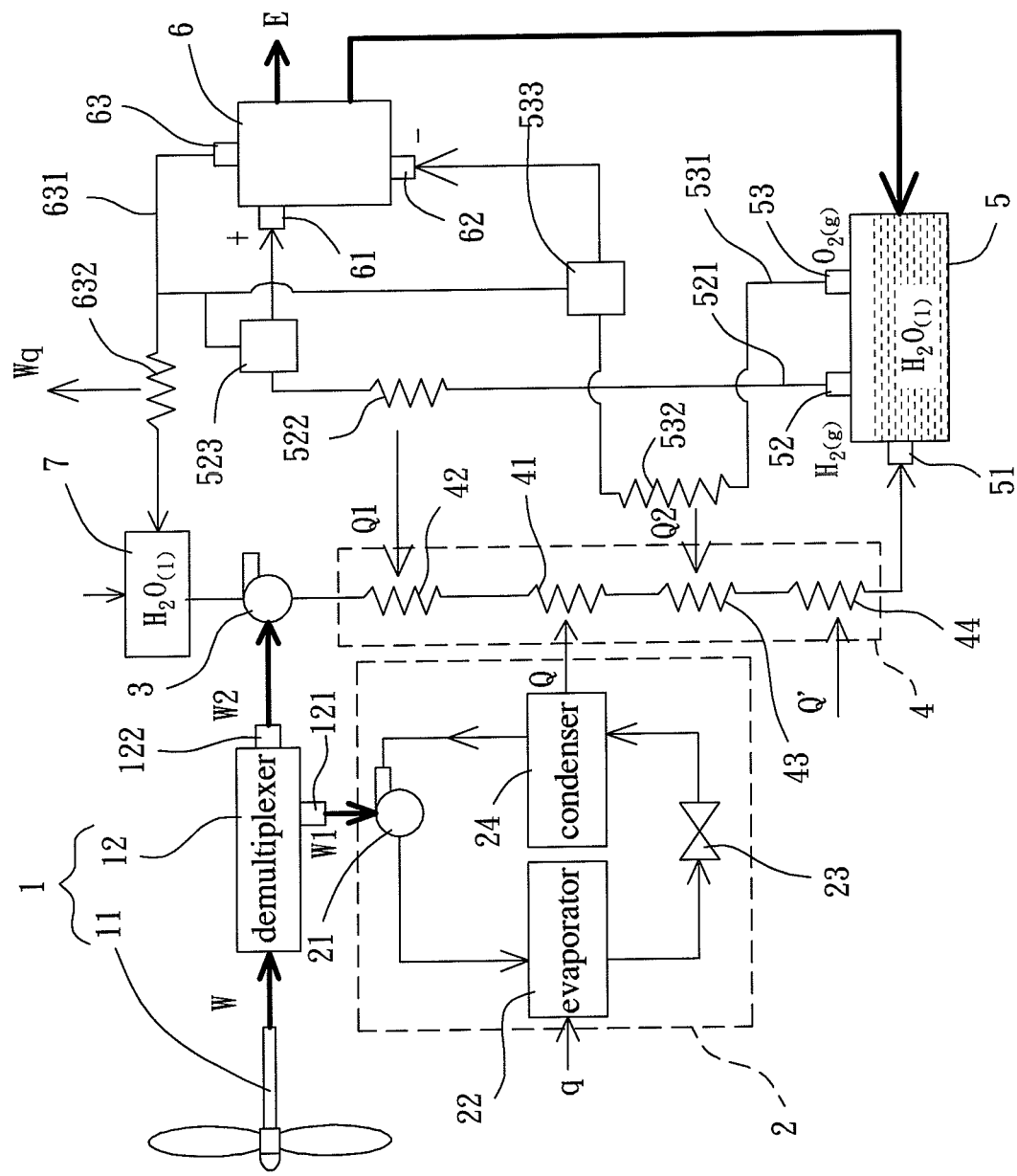
FIG. 3 shows a schematic diagram illustrating a wind power and hydrogen power complex generating device of a second embodiment according to the present invention.

FIG. 3 shows a wind power and hydrogen power complex generating device of a second embodiment according to the present invention. Compared to the first embodiment, the second embodiment includes a first humidifier 523 on the first pipe 521 and a second humidifier 533 on the second pipe 531. The first and second humidifiers 523 and 533 can adjust the relative humidity of the gases in the first and second pipes 521 and 531 in response to the demands of various fuel cell units 6, maintaining the best output efficiency of the fuel cell units 6.

The first humidifier 523 is mounted between the first radiator 522 and the anode passage 61. The first humidifier 523 can be connected by a pipe to the gaseous water output 63 of the fuel cell unit 6. Thus, the first gaseous water from the gaseous water output 63 can flow back to the first humidifier 523, allowing use of the first gaseous water to adjust the humidity of the second gaseous hydrogen.

The second humidifier 533 is mounted between the second radiator 532 and the cathode passage 62. The second humidifier 533 can be connected by a pipe to the gaseous water output 63 of the fuel cell unit 6. Thus, the first gaseous water from the gaseous water output 63 can flow back to the second humidifier 533, allowing use of the first gaseous water to adjust the humidity of the second gaseous oxygen.

The wind power and hydrogen power complex generating device of the second embodiment provides the functions and effects substantially the same of those of the first embodiment. Furthermore, various demands of various fuel cell units 6 can be met by using the first and second humidifiers 533 and 533.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A wind power and hydrogen power complex generating device comprising:
   a fan assembly including a blade unit and a demultiplexer connected to the blade unit, with the demultiplexer including a first output end and a second output end;
   a heating unit connected to the first output end of the demultiplexer;
   a pump connected to the second output end of the demultiplexer, with the pump pressurizing liquid water;
   a heating assembly connected to the pump and the heating unit, with the heating assembly heating the pressurized liquid water into a critical state;
   an electrolyzing unit including an input end, a hydrogen output end and an oxygen output end, with the input end connected to the heating assembly, with the electrolyzing unit electrolyzing the liquid water in the critical state into gaseous hydrogen and gaseous oxygen; and
   a fuel cell unit including an anode passage and a cathode passage, with the anode passage connected to the hydrogen output end, with the cathode passage connected to the oxygen output end,
   wherein the critical state is characterized by pressures above 218 atm and temperatures above 647 K.

2. The wind power and hydrogen power complex generating device as claimed in claim 1, with the heating unit being a solar heater or a heat pump, with the heating assembly including a primary heater connected to the heating unit.

3. The wind power and hydrogen power complex generating device as claimed in claim 2, with the heating assembly further including a first heater mounted between the pump and the primary heater.

4. The wind power and hydrogen power complex generating device as claimed in claim 3, further comprising:

a first radiator connected to the hydrogen output end, with the first radiator connected to the first heater.

5. The wind power and hydrogen power complex generating device as claimed in claim 4, with the heating assembly further including a second heater mounted between the primary heater and the electrolyzing unit.

6. The wind power and hydrogen power complex generating device as claimed in claim 5, further comprising:
a second radiator connected to the oxygen output end, with the second radiator connected to the second heater.

7. The wind power and hydrogen power complex generating device as claimed in claim 1, with the heating unit including a compressor, an evaporator, a throttle valve and a condenser connected in series to form a closed system, with the compressor connected to the demultiplexer, with the condenser connected to the heating assembly.

8. The wind power and hydrogen power complex generating device as claimed in claim 1, with the fuel cell unit including a gaseous water output, with a radiator connected to the gaseous water output.

9. The wind power and hydrogen power complex generating device as claimed in claim 8, further comprising:
a water tank mounted between the pump and the gaseous water output of the fuel cell unit.

10. The wind power and hydrogen power complex generating device as claimed in claim 8, further comprising:
a first humidifier mounted between the hydrogen output end and the anode passage;
and a second humidifier mounted between the oxygen output end and the cathode passage, with each of the first and second humidifiers connected by a pipe to the gaseous water output.

* * * * *